(12) United States Patent
Rupp et al.

(10) Patent No.: US 10,589,762 B2
(45) Date of Patent: Mar. 17, 2020

(54) TRANSVERSE RAIL SWITCHING ELEMENT (71) Applicant: Dynamic Attractions Ltd.

(72) Inventors: David Robert Rupp, Frederick, MD (US); Cynthia Lynn Emerick-Whitson, Camden, OH (US)

(73) Assignee: Dynamic Attractions Ltd., Winnipeg, MB (CA)

( * ) Notice: Subject to any disclaimer, the term of this patent is extended or adjusted under 35 U.S.C. 154(b) by 21 days.

(21) Appl. No.: 15/470,555

(22) Filed: Mar. 27, 2017

(65) Prior Publication Data

US 2017/0197642 A1    Jul. 13, 2017

Related U.S. Application Data

(63) Continuation of application No. 15/057,220, filed on Mar. 1, 2016, now abandoned.

(60) Provisional application No. 62/127,446, filed on Mar. 3, 2015.

(51) Int. Cl.
| | |
|---|---|
| *B61H 7/00* | (2006.01) |
| *B60T 1/14* | (2006.01) |
| *B61H 7/12* | (2006.01) |
| *A63G 21/14* | (2006.01) |
| *F16D 63/00* | (2006.01) |
| *A63G 7/00* | (2006.01) |
| *B61B 13/00* | (2006.01) |
| *B61F 13/00* | (2006.01) |
| *B61H 9/00* | (2006.01) |

(52) U.S. Cl.
CPC ............. *B61H 7/00* (2013.01); *A63G 7/00* (2013.01); *A63G 21/14* (2013.01); *B60T 1/14* (2013.01); *B61B 13/00* (2013.01); *B61F 13/00* (2013.01); *B61H 7/12* (2013.01); *B61H 9/00* (2013.01); *F16D 63/008* (2013.01)

(58) Field of Classification Search
CPC ........ A63G 31/00; A63G 31/02; A63G 31/04; A63G 31/06; A63G 31/10; A63G 31/16
See application file for complete search history.

(56) References Cited

U.S. PATENT DOCUMENTS

| 4,357,875 A | 11/1982 | Scheel |
| 6,941,872 B2 * | 9/2005 | Roodenburg ............ A63G 7/00 |
| | | 104/53 |

(Continued)

OTHER PUBLICATIONS

International Search Report for PCT/CA2016/050213 dated May 11, 2016.
Written Opinion for PCT/CA2016/050213 dated May 9, 2016.

*Primary Examiner* — Robert J McCarry, Jr.
(74) *Attorney, Agent, or Firm* — Gottlieb, Rackman & Reisman, P.C.

(57) ABSTRACT

In at least one embodiment the present invention provides a transverse rail switching element for switching a rail vehicle from a first position to a transversely removed second position in a thrilling manner, having an entry track section, a vehicle shuttle adapted to receive a rail vehicle from the entry track section at the first position, a transverse track section extending from the first position to the transversely removed second position, at least one exit track section, primary propulsion means adapted to translate the rail vehicle from the vehicle shuttle to the at least one exit track section when the vehicle shuttle is in the transversely removed second position.

12 Claims, 6 Drawing Sheets

(56) References Cited

U.S. PATENT DOCUMENTS 7,484,460 B2    2/2009  Blum et al.
8,943,975 B2 *  2/2015  Gmeinwieser ........... A63G 7/00
                                              104/53

* cited by examiner

TRANSVERSE RAIL SWITCHING ELEMENT

CROSS-REFERENCE TO RELATED APPLICATIONS

This application is a continuation application of U.S. patent application Ser. No. 15/057,220 filed Mar. 1, 2016 which claims the benefit and priority of U.S. Provisional Patent Application No. 62/127,446 filed on Mar. 3, 2015. The foregoing application is incorporated by reference herein in its entirety.

FIELD OF THE INVENTION

The present invention relates to amusement park rides. More specifically, the present invention relates to a transverse rail switching element for switching a rail vehicle in a thrilling manner from a first position to a transversely removed second position.

BACKGROUND

Amusement rides are popular diversions around the world and provide a thrilling and otherwise unattainable entertainment experience in a safe, controlled manner.

Ride designers are constantly seeking novel ways in which to safely improve the ride experience and in this process have developed a wide variety of track designs and features that distinguish one ride from another, such as: hanging roller coasters, upside down loops, corkscrew loops, stand-up roller coasters, near vertical drops, backwards travel, among any other number of ride features that offer a thrilling experience in a safe manner.

Moreover, it is often desirable to switch a ride car from a first track to a second track for a variety of reasons. In some applications, it is desirable to switch the rail car from a first track to a second track in an exciting manner that adds to the entertainment experienced by a rider.

Accordingly, there is need for a track switching element that can switch a rail vehicle from a first track to a transversely removed second track while providing a safe yet thrilling and novel ride experience.

SUMMARY

In at least one embodiment, the present invention provides a transverse track switching element that can switch an amusement ride car from a first track to a transversely removed second track in a safe yet thrilling manner.

In at least one embodiment, the present invention provides a transverse rail switching element for switching a rail vehicle from a first position to a transversely removed second position having an entry track section having at least one longitudinally extending entry rail, a vehicle shuttle having a first end and a second end and adapted to receive a rail vehicle at the first position and having at least one longitudinally extending intermediary rail on a top surface, the at least one longitudinally extending intermediary rail communicating with the at least one longitudinally extending entry rail when the shuttle is in the first position, the top surface of the vehicle shuttle having braking means for decelerating the rail vehicle as the rail vehicle moves from the entry rail section to the at least one longitudinally extending intermediary rail of the vehicle shuttle, a transverse track section extending from the first position to the transversely removed second position, the transverse track section having secondary braking means for decelerating the vehicle shuttle as it moves from the first position to the transversely removed second position, at least one exit track section having at least one longitudinally extending exit rail, the at least one longitudinally extending exit rail communicating with the at least one longitudinally extending intermediary rail when the vehicle shuttle is in the transversely removed second position, primary propulsion means adapted to translate the rail vehicle from the vehicle shuttle to the at least one exit track section when the vehicle shuttle is in the transversely removed second position, and the rail vehicle having at least one rail bogie communicating with the at least one longitudinally extending entry rail, the at least one longitudinally extending intermediary rail and the at least one longitudinally extending exit rail.

BRIEF DESCRIPTION OF THE FIGURES

The present invention will be better understood in connection with the following Figures, in which.

DETAILED DESCRIPTION

In at least one embodiment, the present invention provides a transverse switching element that can switch an amusement ride car from a first track to a transversely removed second track in a safe yet thrilling manner.

It will be readily understood that all components discussed herein can be constructed of any suitable materials including but not limited to various structural steel alloys. Further, all components discussed herein can be manufactured by any suitable process that will be readily appreciated by the skilled person. Each component discussed herein can be formed from multiple sub-components suitably joined together or alternatively each component can be formed as a single unitary component.

In at least one embodiment, it is contemplated that the first track is an entry track section that is located in a first position and the second track is an exit track section located at a transversely removed second section. Specifically, it is contemplated that the second position can be located at any transverse position such as, but not limited to, either directly lateral to, diagonally anterior to and diagonally posterior to the first position, as will be readily appreciated by the skilled person. Further, in some embodiments it is contemplated that the first position is located at a higher elevation than the second position or at a lower elevation than the second position, among other arrangements that will be readily appreciated by the skilled person.

In at least one embodiment, it is contemplated that the entry rail track section and the exit track section is adapted to receive a rail vehicle. However, any number of rail track section designs can be contemplated for use in connection with the present invention, however in at least one embodiment it is contemplated that both the entry track section and the exit track section have an upper surface that has at least one rail component. In at least one embodiment, it is contemplated that the entry rail section and the exit rail section have a pair of rail components that are oriented parallel to one another and which extend along a longitudinal axis of the upper surface of the respective exit/entry rail section.

It is contemplated that the rail vehicle has at least one rail bogie that is adapted to communicate with the rail components of the entry rail section and the exit rail section. It is contemplated that the rail bogie has at least one bogie wheel, however in some embodiments it is contemplated that the bogie can have a pair of opposed, vertically oriented wheels (or alternatively, two pairs, of opposed, vertically oriented wheels) and at least one horizontally oriented wheel, however, other bogie arrangements are also contemplated as will be readily appreciated by the skilled person.

It is contemplated that the rail components discussed herein can take any number of rail profiles as required by the instant application of the present invention. In at least one embodiment, the head of rail component has a circular profile, however other profiles, such as square, rounded or otherwise, are also contemplated as will be readily understood by the skilled person.

Both the entry rail section (in the first position) and the exit rail section (in the second position) engage and communicate with a vehicle shuttle that is movably mounted to at least one rail component of a transverse track section that connects the first position to the second position. Therefore, the rail vehicle can move between the entry rail section and the vehicle shuttle, the vehicle shuttle can transversely translate between the first position and second position, and subsequently the rail vehicle can move between the vehicle shuttle and at least one exit rail section. In this way, the rail vehicle can be "switched" between the entry track section and the exit track section.

Accordingly, in at least one embodiment it is contemplated that the vehicle shuttle has a first end, a second end, an upper surface and a lower surface. The upper surface has at least one intermediary rail component that extends along a longitudinal axis of the vehicle shuttle that extends between the first end and the second end. It is further contemplated that the intermediary rail component communicates with both the at least one rail component of the entry rail section (in the first position) and the at least one rail component of the exit rail section (in the second position).

Further, it is contemplated that the lower surface of the vehicle shuttle has a vehicle shuttle bogie that engages with at least one rail component of the transverse track section. It is contemplated that the vehicle shuttle bogie is adapted to communicate with the at least one rail component of the transverse track section. It is further contemplated that the vehicle shuttle bogie has at least one bogie wheel, however in some embodiments it is contemplated that the bogie can have a pair of opposed, vertically oriented wheels (or alternatively, two pairs, of opposed, vertically oriented wheels) and at least one horizontally oriented wheel, however, other bogie arrangements are also contemplated as will be readily appreciated by the skilled person.

It is further contemplated that the vehicle shuttle can include braking means on the upper surface of the vehicle shuttle for decelerating the rail vehicle as the rail vehicle moves from the entry rail section to vehicle shuttle, as will be readily understood by the skilled person. In at least one embodiment, the braking means are linear synchronous motor stators, however other arrangements are contemplated that will be readily appreciated by the skilled person.

It is also contemplated that the upper surface of the vehicle shuttle can have shock absorbing means adapted to assist with deceleration of the rail vehicle as the rail vehicle moves from the entry rail section to vehicle shuttle. Further, it is contemplated that in some embodiments it is contemplated that the vehicle shuttle can have mechanical pinch brakes adapted to secure the rail vehicle when it is positioned on the vehicle shuttle.

In some embodiments, it is contemplated that at least one of the first end and the second end of the vehicle shuttle has a track interlock pin mechanism for securing the vehicle shuttle to the entry track section or the exit track section, depending on whether the vehicle shuttle is in the first position and the second position.

As discussed above, the transverse track section has at least one rail component and extends between the first position and the second position. It is contemplated that the transverse track section can take any potential shape, including but not limited to curved, serpentine, downwardly sloping, upwardly sloping, straight, among any other shapes that will be readily understood by the skilled person. In at least one embodiment, it is contemplated that the transverse track section is straight and downwardly sloping, as illustrated in the figures discussed below, however any other arrangement is contemplated as will be readily appreciated by the skilled person. In at least one embodiment, it is contemplated that the transverse track section has a generally horizontal first section, an intermediary second section and a generally horizontal third section, as discussed in further detail below.

In at least one embodiment, the transverse track section includes transverse drive means that engage the vehicle shuttle and translate it along the first horizontal section to at least the intermediary second section. In at least one embodiment, it is contemplated that the transverse drive means are a chain drive means having a drive motor that rotates a sprocket that in turn rotates a drive chain that is operatively engaged to the vehicle shuttle, among other embodiments that are readily appreciated by the skilled person. In other embodiments, it is contemplated that the transverse drive means are a linear synchronous motor.

Further, in some embodiments, it is contemplated that the transverse track section can include a secondary braking means for decelerating the vehicle shuttle as it moves from the first position to the second position. In at least one embodiment it is contemplated that the secondary braking means are continuous magnetic brake fins. In at least one embodiment, the secondary braking means are located partly on the intermediary second section and the generally horizontal third section, although other arrangements are also contemplated as will be readily appreciated by the skilled person.

It is contemplated that additional systems can be included on the transverse track section including, but not limited to, shock absorbing means for assisting in the deceleration of the shuttle vehicle, a cable tray and at least one winch means located adjacent one of the first position and the second position.

Figure 1:
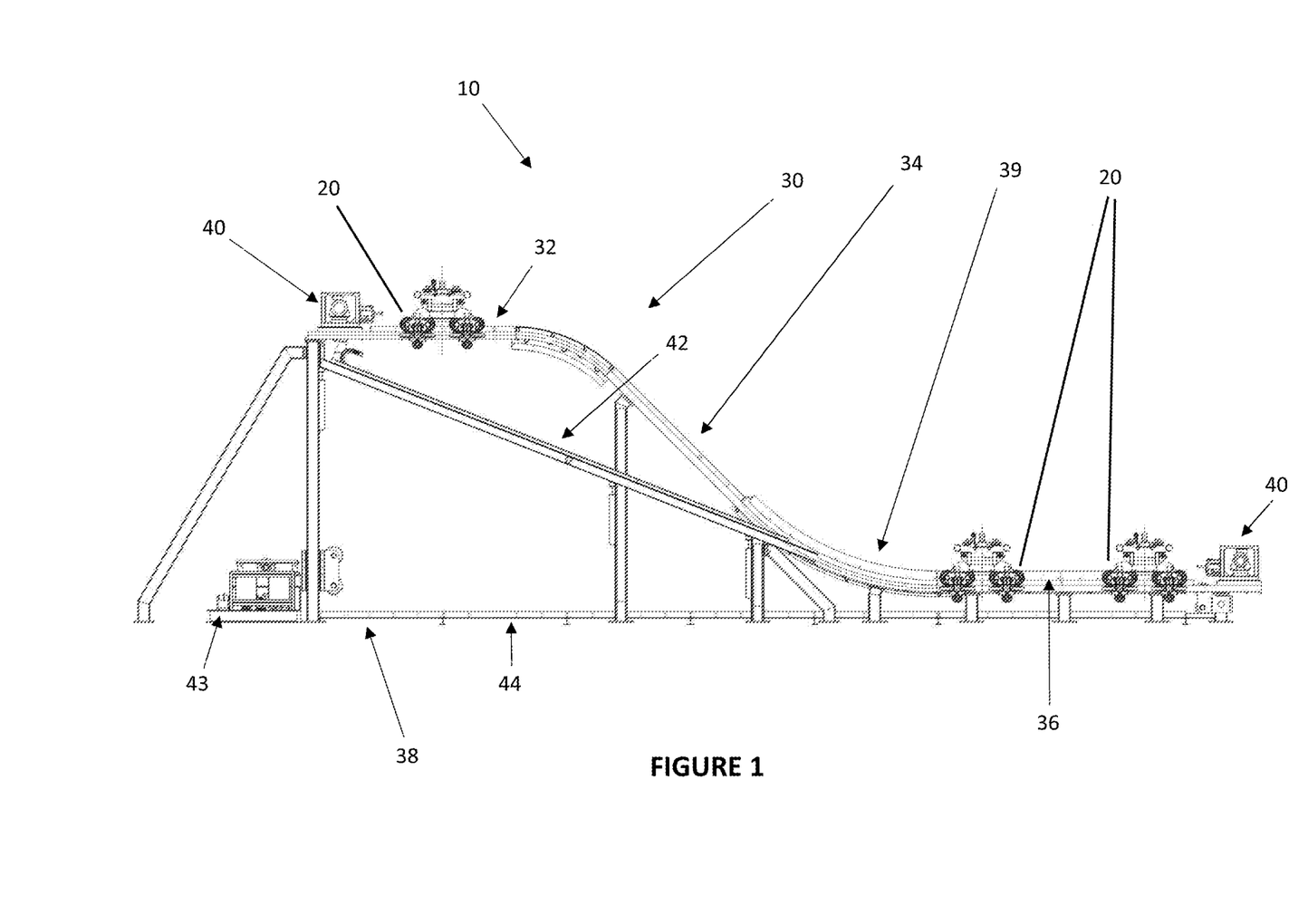
FIG. 1 is a side view of a transverse rail switching element with the vehicle shuttle is in multiple positions in accordance with at least one embodiment of the present invention.
Figure 2:
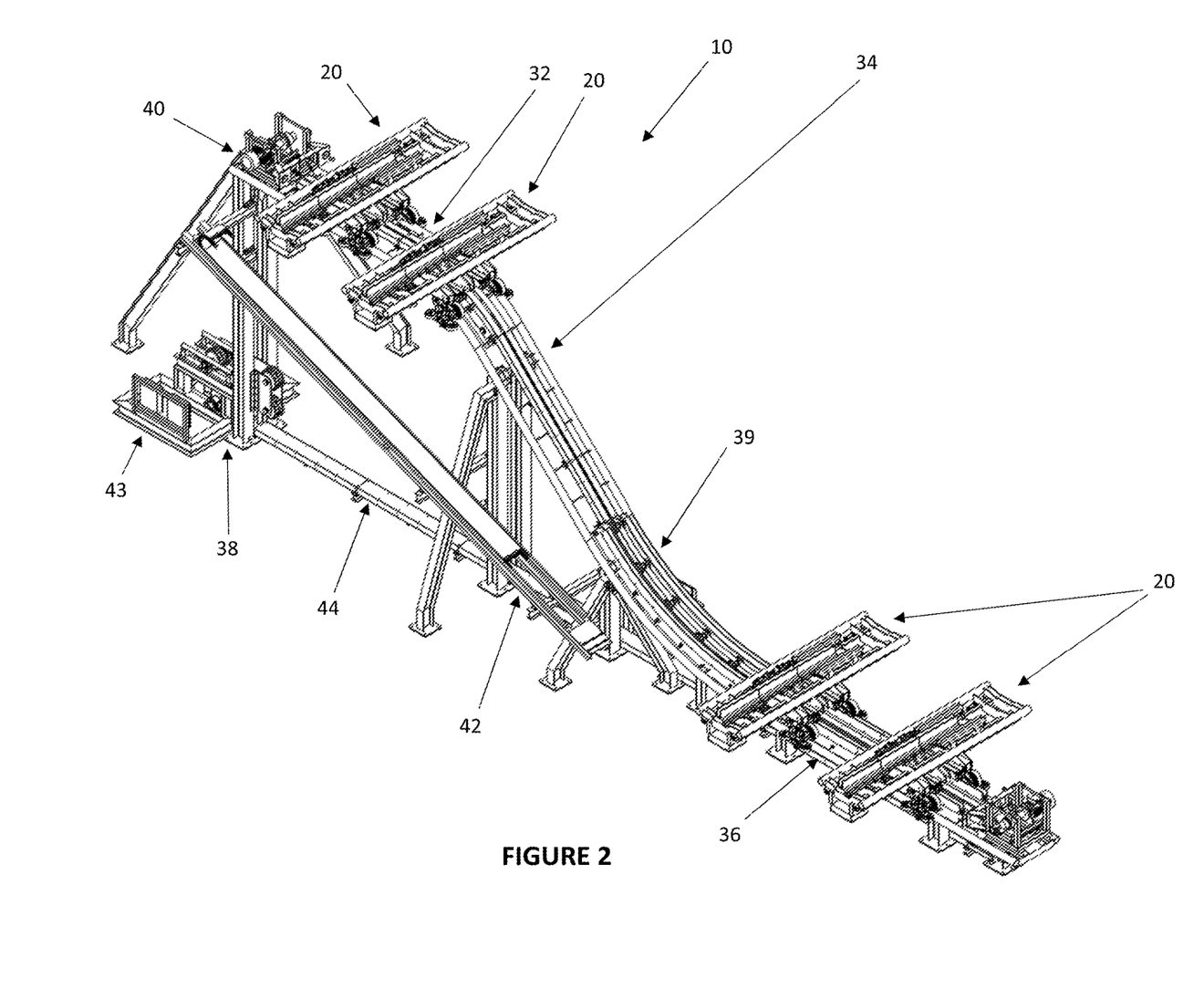
FIG. 2 is an upper perspective view of a transverse rail switching element where the vehicle shuttle is in multiple positions in accordance with at least one embodiment of the present invention.

Turning to FIGS. 1 and 2, at least one embodiment of a track switching element for switching a rail vehicle in a safe but thrilling manner in accordance with the present invention is illustrated. Track switching element 10 consists of an entry track section (not shown), at least one exit track section (not shown), a vehicle shuttle 20 and a transverse track section 30. In this embodiment, the entry track section is located at the entrance station and the at least one exit track section is located at the first exit and maintenance station and the second exit and maintenance station.

As can be seen in FIGS. 1 and 2, in this embodiment transverse track section 30 has a first, generally horizontal section 32, a second, downwardly sloped section 34, and a third, generally horizontal section 36, however other arrangements of transverse track section as will be readily appreciated by the skilled person.

Further, in this embodiment the transverse track section 30 can include additional, optional components such as at least one emergency winch 40 (which can be located at either end of transverse track section), a cable tray 42, over travel shock-absorbing means, transverse propulsion means 38 and secondary braking means 39. In this embodiment, transverse propulsion means 38 includes a drive motor 43 having a chain tensioner, service panels and a chain trough 44.

Figure 3:
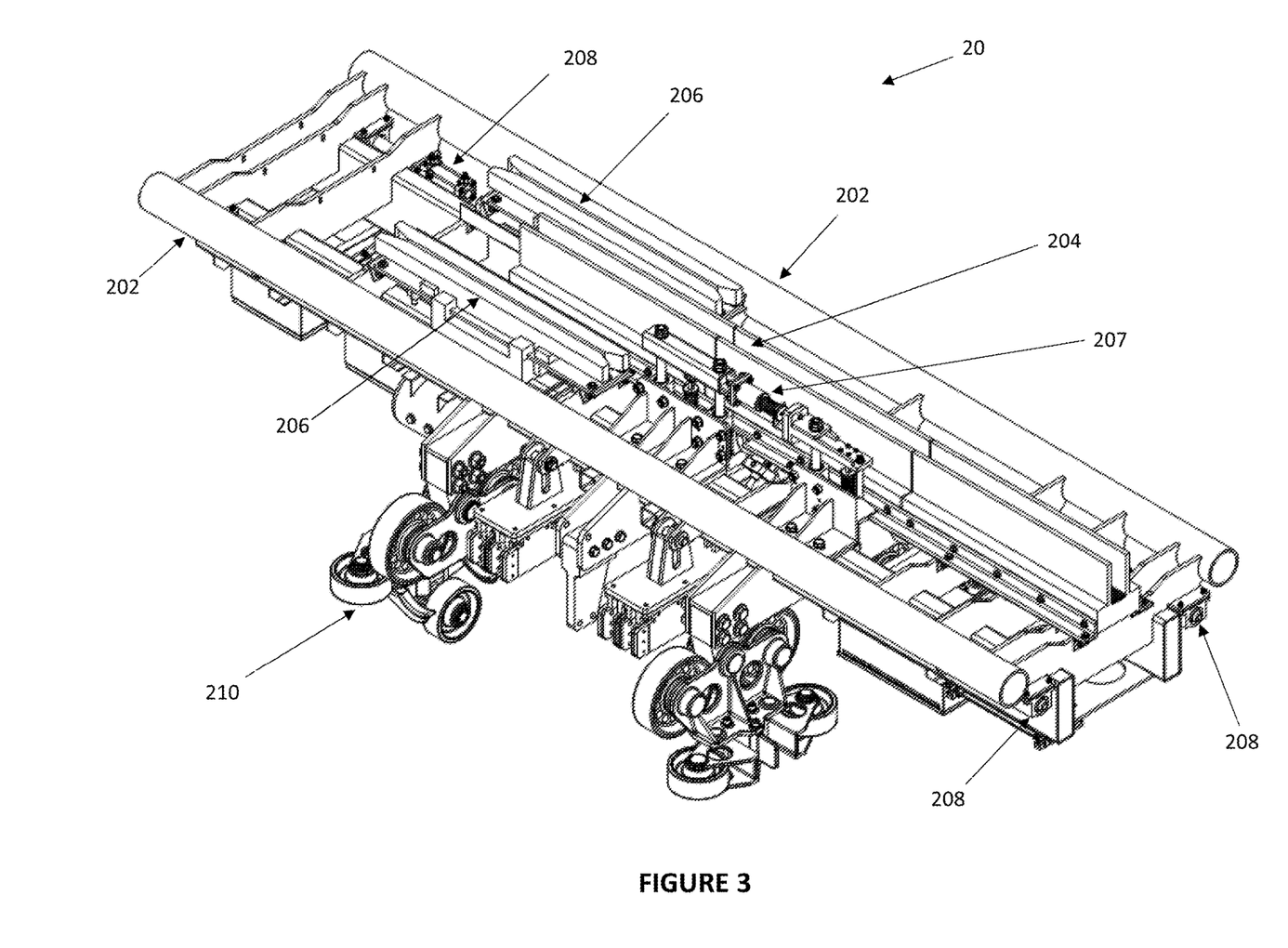
FIG. 3 is an upper perspective view of a vehicle shuttle in accordance with at least one embodiment of the present invention.
Figure 4:
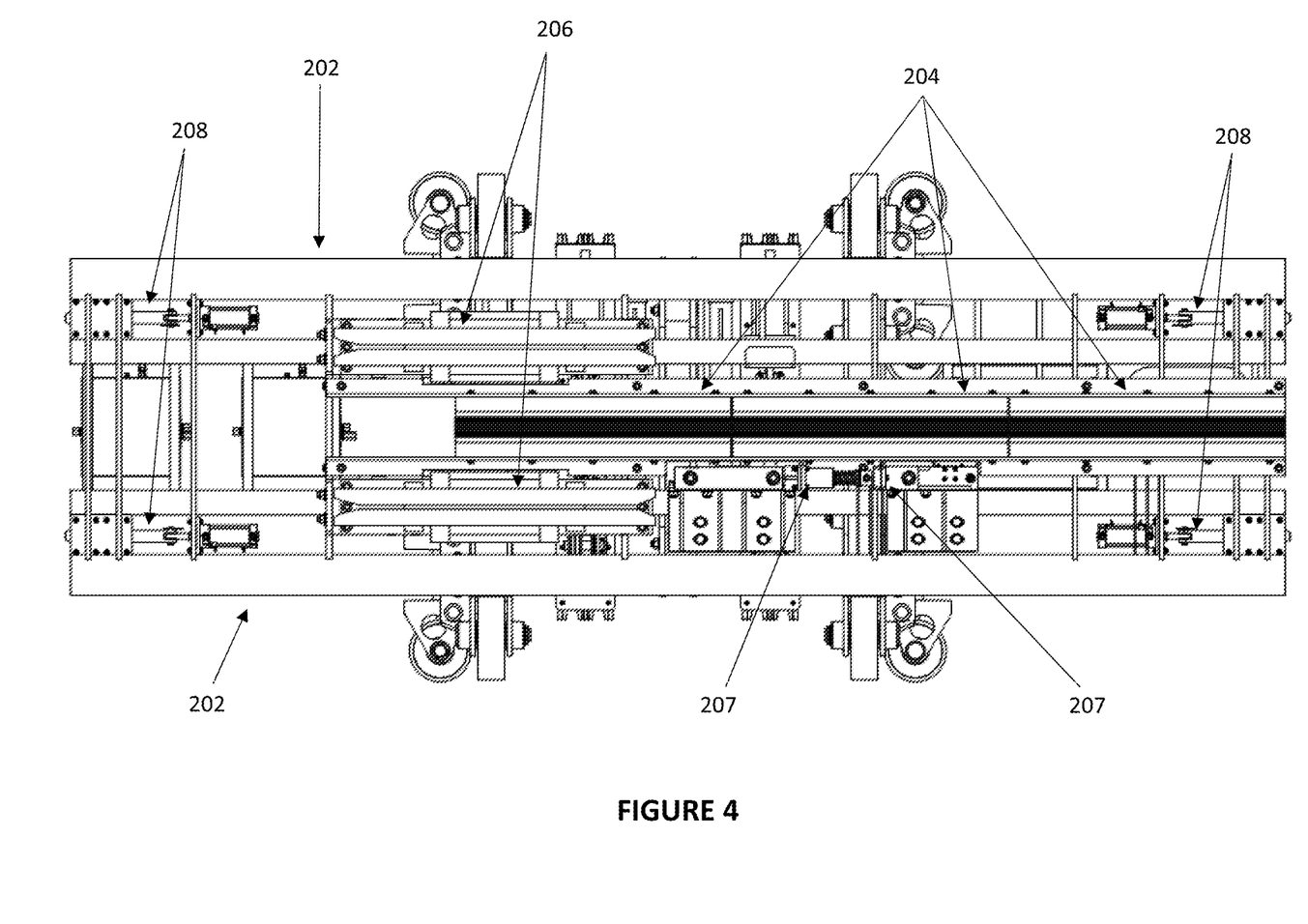
FIG. 4 is a top view of the upper surface of a vehicle shuttle in accordance with at least one embodiment of the present invention.
Figure 5:
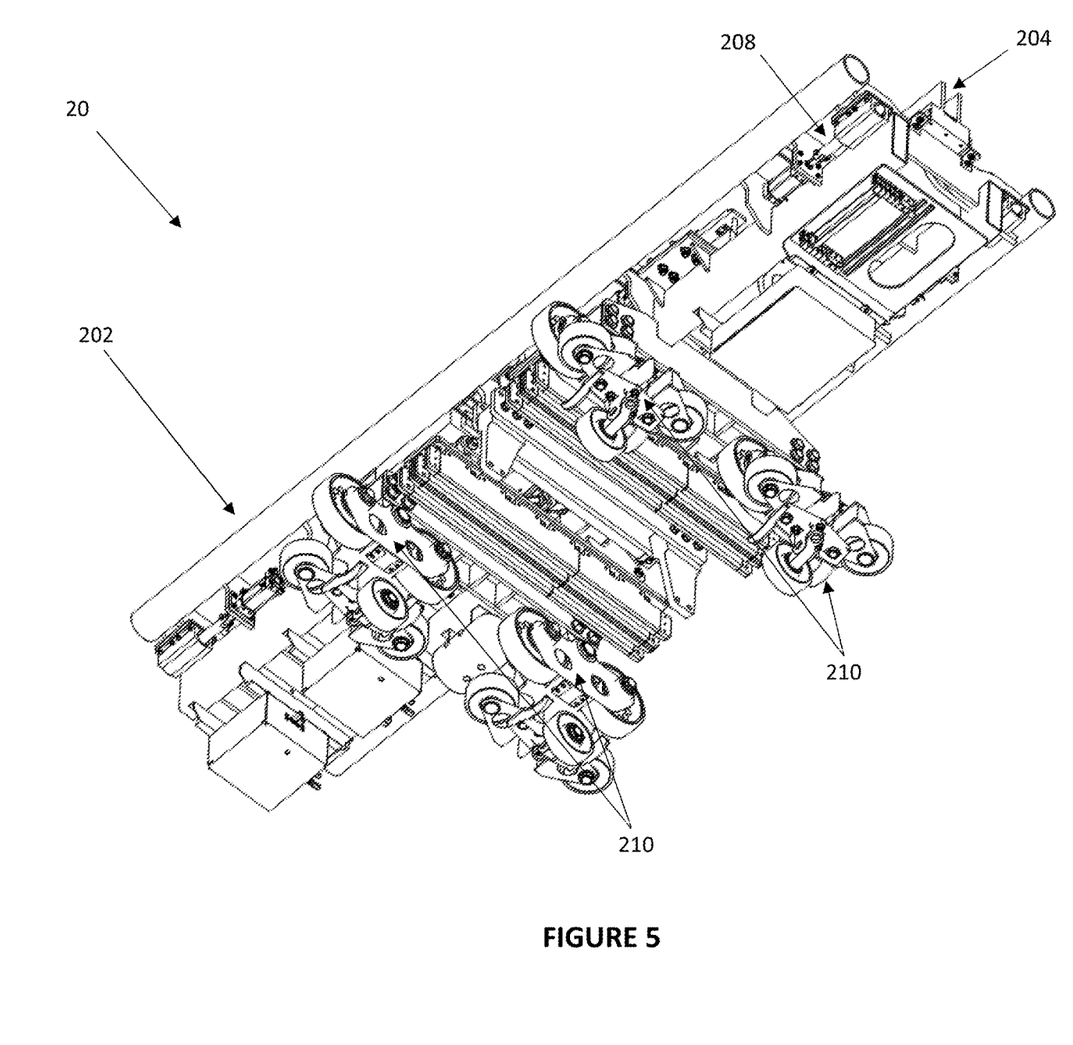
FIG. 5 is a lower perspective view of a vehicle shuttle in accordance with at least one embodiment of the present invention.

Turning to FIGS. 3, 4 and 5, at least one embodiment of a vehicle shuttle for use in connection with the present invention is illustrated. Vehicle shuttle 20 has at least one rail 202 that longitudinally extends adjacent the upper surface of vehicle shuttle 20. In this embodiment, vehicle shuttle has two longitudinally extending rail components 202. A vehicle shuttle bogie 210 can be mounted to a lower surface of vehicle shuttle 20.

Further, various systems can be mounted adjacent the upper surface of vehicle shuttle 20 including, but not limited to, braking means 204 for braking the rail vehicle, mechanical pinch brakes 206 for securing the rail vehicle relative to the vehicle shuttle, shock absorbing means 207 for cushioning the deceleration of the rail vehicle as it decelerates and at least one track interlock pin mechanism 208 for securing the vehicle shuttle relative to at least one of the entry track section and the exit track section.

With reference to FIG. 5, the lower surface of one embodiment of vehicle shuttle 20 is illustrated. In this embodiment, two vehicle shuttle bogies 210 are provided that engage with the at least one rail component of the transverse track section 30. Further, optional systems can be included such as a pneumatic actuation system (which can consist of, for example, a 5- and 10-gallon receiver and dedicated pneumatic panels) for use in actuating track interlock pin mechanism 208 or mechanical pinch brakes 206 (as seen in FIG. 4). Other optional systems can include chain attachment plates (for engaging with transverse propulsion means 38) and magnet banks (for engaging with secondary braking means 39) and are also contemplated for use in connection with the present invention.

Figure 6:
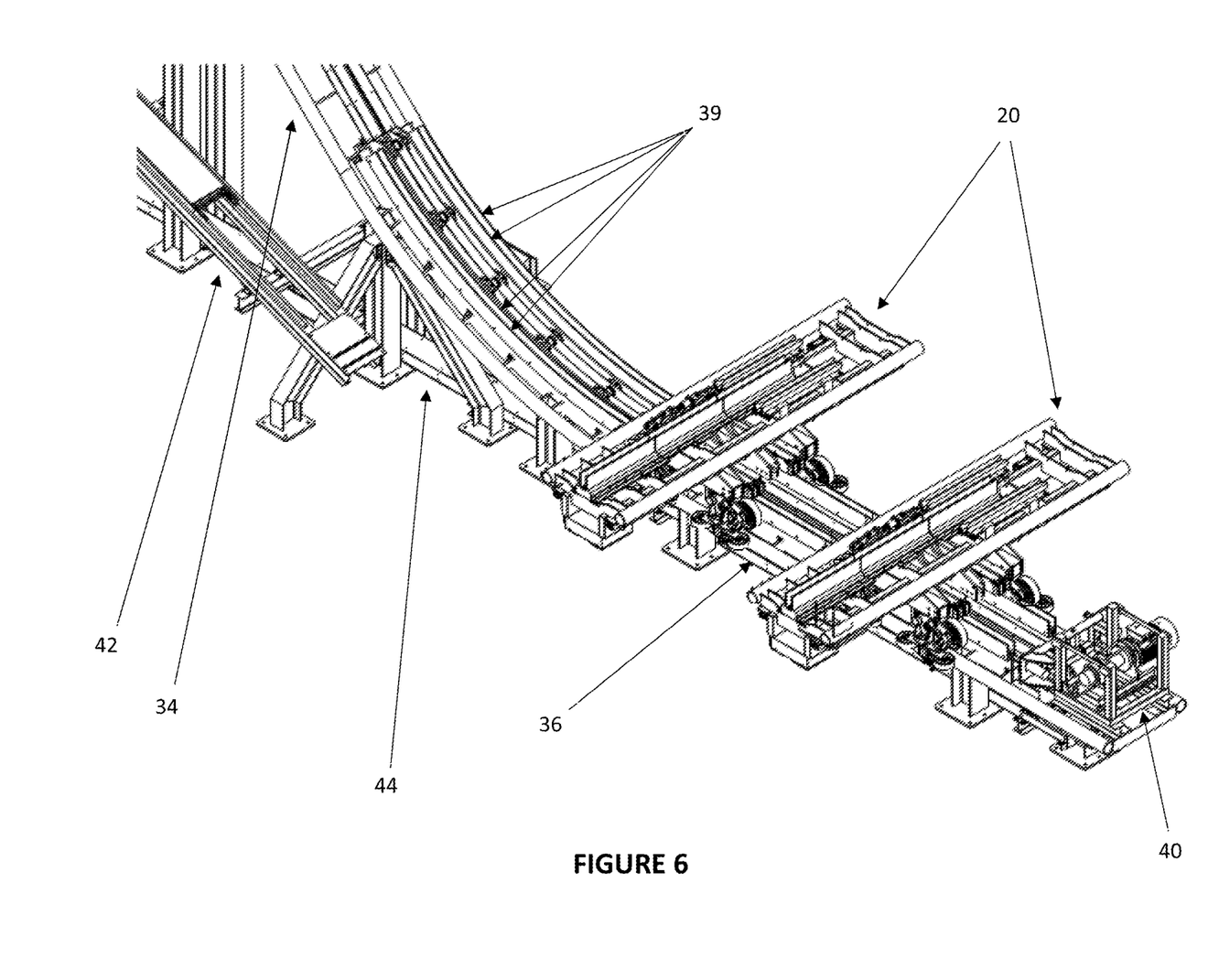
FIG. 6 is an upper perspective view of the exit rail section of a transverse rail switching element with the shuttle vehicle in two possible second positions in accordance with at least one embodiment of the present invention.

Turning to FIG. 6, a close up of third section 36 of transverse track section 30 of a track switching element 10 in accordance with at least one embodiment of the present invention is illustrated. Third section 36 has secondary braking means 39 that in this embodiment are continuous magnetic brake fins. In this embodiment, vehicle shuttle 20 can be moved to one of two second positions where it can engage with the exit track section (not shown). Optional equipment can be included on transverse track section 30 such as, but not limited to, emergency winch means 40 and cable tray 42 and chain trough 44.

In this way, it is contemplated that a rail vehicle can travel from an entry rail section to the vehicle shuttle when the shuttle is in the first position. It is contemplated that vehicle shuttle is secured to entry rail section by way of track interlock pin mechanism. Braking means can be used to decelerate the rail vehicle and mechanical pinch brakes can be used to secure rail vehicle relative to vehicle shuttle.

Next, track interlock pin mechanism can be disengaged and vehicle shuttle can be translated along transverse track section from the first, generally horizontal section to the second, sloped section by way of transverse propulsion means. Once vehicle shuttle reaches the second, sloped section of the transverse track section, it will be readily understood that the vehicle shuttle will continue to travel down the second, sloped section to the third, generally horizontal section of the transverse track section under the force of gravity.

As vehicle shuttle travels from the second, sloped section to the third, generally horizontal section of the transverse track section secondary braking means can be engaged to decelerate vehicle shuttle such that it comes to a rest at the second position where it can engage with the exit track section. It is contemplated that the vehicle shuttle can be secured relative to the exit track section by way of track interlock pin mechanism. Finally, winch means can be provided at either end of transverse track section to assist with manipulation of the vehicle track shuttle from the first position to the second position (and vice versa) in a no power situation or other emergency/maintenance situations, as will be readily understood by the skilled person.

Finally, it is contemplated that primary propulsion means can be provided on one of the vehicle shuttle and the exit track section such that when the vehicle shuttle is in the transversely removed second position, the vehicle shuttle can be secured relative to the exit track section, the mechanical pinch brakes can be released and the rail vehicle can be accelerated from vehicle shuttle to the exit track section by way of primary propulsion means.

It is contemplated that the primary propulsion means can be a wide variety of known rail propulsion means as will be readily appreciated by the skilled person, however in at least one embodiment the primary propulsion means are the braking means (and more specifically, a linear synchronous motor stator) that is located on the vehicle shuttle and can be used to both decelerate the rail vehicle as it moves from the entry track section to the vehicle shuttle in the first position and accelerate the vehicle when it moves from the vehicle shuttle to the exit rail section in the transversely removed second position, among other arrangement that will be readily appreciated by the skilled person.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A transverse rail switching element for switching a rail vehicle from a first position to a transversely removed second position, comprising:
   a vehicle shuttle having a first end, a second end, an upper surface and a lower surface and adapted to receive a rail vehicle at a first position and having at least one longitudinally extending intermediary rail on an upper surface, the at least one longitudinally extending intermediary rail configured to receive the rail vehicle when the vehicle shuttle is in the first position, the upper surface of the vehicle shuttle having braking means for decelerating the rail vehicle as the rail vehicle moves onto the at least one longitudinally extending intermediary rail of the vehicle shuttle, the lower surface of the vehicle shuttle having a vehicle shuttle bogie;

a transverse track section extending from the first position to the transversely removed second position, the transverse track section substantially perpendicular to the at least one longitudinal extending intermediary rail when the vehicle shuttle is at the first position and when the vehicle shuttle is at the second position, wherein the first position and the second position are primarily separated horizontally, the transverse track section having secondary braking means for decelerating the vehicle shuttle as it moves from the first position to the transversely removed second position, the transverse track section having at least one rail component that engages with the vehicle shuttle bogie; and primary propulsion means adapted to translate the rail vehicle off of the vehicle shuttle.

2. The transverse rail switching element of claim 1 wherein the transverse track section further comprises a generally horizontal first section, an intermediary second section and a generally horizontal third section, the transverse track section having a transverse propulsion system adapted to translate the vehicle shuttle from the generally horizontal first section to at least the intermediary second section.

3. The transverse rail switching element of claim 1 wherein the secondary braking means are continuous magnetic brake fins.

4. The transverse rail switching element of claim 1 wherein the vehicle shuttle further comprises shock absorbing means adapted to assist with deceleration of the rail vehicle when the rail vehicle is received by the vehicle shuttle.

5. The transverse rail switching element of claim 1 wherein the top surface of the vehicle shuttle further comprises mechanical pinch brakes adapted to secure the rail vehicle relative to the vehicle shuttle.

6. The transverse rail switching element of claim 1 wherein the intermediary second section is sloped downwardly such that the first position is located at a higher vertical elevation than the transversely removed second position.

7. The transverse rail switching element of claim 1 wherein the at least one vehicle shuttle bogie comprises at least one vertically oriented wheel and at least one horizontally oriented wheel.

8. The transverse rail switching element of claim 1 wherein the transverse propulsion means is selected from the group consisting of: a chain drive propulsion system and a linear synchronous motor.

9. The transverse rail switching element of claim 1 wherein the generally horizontal third section of the transverse track section comprises shock absorbing means adapted to assist with deceleration of the vehicle shuttle when the vehicle shuttle moves from the first position to the transversely removed second position.

10. The transverse rail switching element of claim 1 wherein the braking means are linear synchronous motor stators.

11. The transverse rail switching element of claim 1 wherein the transverse track section further comprises at least one winch means, the at least one winch means located adjacent to at least one of the first position and the second position.

12. The transverse rail switching element of claim 1 wherein the braking means and the primary propulsion means are linear synchronous motor stators.

* * * * *